May 10, 1966     M. F. M. BRUYERE     3,250,089

COUPLING DEVICES FOR ROTATING SHAFTS DISPOSED END TO END

Filed April 6, 1964     3 Sheets-Sheet 1

United States Patent Office 3,250,089
Patented May 10, 1966

3,250,089
COUPLING DEVICES FOR ROTATING SHAFTS
DISPOSED END TO END
Marcel François Martin Bruyere, Bois-Colombes, France, assignor to Societe d'Exploitation des Materials Hispano-Suiza, Bois-Colombes (Seine), France, a society of France
Filed Apr. 6, 1964, Ser. No. 357,623
Claims priority, application France, Apr. 10, 1963, 931,127, Patent No. 1,361,493
11 Claims. (Cl. 64—11)

The present invention relates to devices for angularly coupling two rotating parts having their respective axes of rotation disposed approximately in line with each other and intended to rotate at the same speed, at least one of said parts being tubular about its axis. The invention is more especially concerned with devices for the coupling of tubular shafts disposed in line with each other but which are to undergo slight misalinements.

The object of the present invention is to provide a device of this kind which is better adapted to meet the requirements of practice than those known up to this time and especially a device which occupies a smaller volume, is lighter and is easier to take to pieces than those known up to this time.

According to a feature of the present invention, first there is force fitted on said rotating part of tubular shape, with a positive coupling, an external sleeve rotatable together with the other rotating part, secondly there is provided, inside said tubular rotating part, an expanding device in frictional contact with the inner wall of said tubular part and capable of exerting on said inner wall an outward radial pressure tending to apply the outer wall of said tubular part against the inner wall of the external sleeve and finally at least one connecting piece is interposed between said expanding device and said external sleeve to prevent angular displacements between them.

Owing to such an arrangement the coupling device according to the invention gets the benefit not only of the external friction torque due to the frictional contact between the tubular part and the external sleeve but also of the internal friction torque, due to the frictional contact existing between the expanding device and the tubular part, which last mentioned torque is transmitted to said connecting piece.

According to another feature of the invention, for coupling together two rotating shafts disposed in line with each other and liable to undergo small misalinement relative displacements, said coupling device comprising peripheral connecting means having practically no resiliency in the circumferential direction but slightly deformable in radial planes to permit small relative pivoting displacements of the two shafts about a center located on the axis common to said shafts when they are in line with each other, this center is determined by a centering device which comprises a resilient connecting element permitting, by deformation thereof, slight relative movements of the two shafts with respect to each other corresponding to misalinements and sliding displacements.

According to another feature of the invention, the devices of the type above described comprise at least two pairs of annular connecting structures having no resiliency in the circumferential direction but slightly deformable in radial planes passing through said shafts when they are disposed substantially in line with each other, one of said pairs of annular structures connecting one of said shafts to a rigid intermediate element coaxial with the whole of the device, whereas the other pair of annular structures connects said intermediate element to the other shaft, both of said shafts being on the other hand subjected to the action of a plurality of resilient bracing discs capable, by deformation in their plane, of maintaining the point of intersection of the axes of the two shafts (in case of slight misalinement between them) substantially at the middle point of the coupling device.

According to still another feature of the invention, whereas, at each of the opposite ends of the shafts to be coupled together, there is provided at least one pair of annular connecting means having no resiliency in the circumferential direction but slightly deformable in radial planes, the annular structures belonging respectively to each of these two pairs are angularly coupled together by a rigid sliding joint of the type including grooves, the male and female respective portions of which cooperate together through rolling means (balls or rollers) disposed to work substantially in pure rolling fashion during the relative displacements of the cooperating parts.

Preferred embodiments of the present invention will be hereinafter described with reference to the appended drawings, given merely by way of example, and in which.

The coupling device according to the present invention, as illustrated by the drawings, is intended to connect together two tubular shafts $1a$ and $1b$ disposed substantially end to end and liable to undergo small misalinements.

Figure 2:
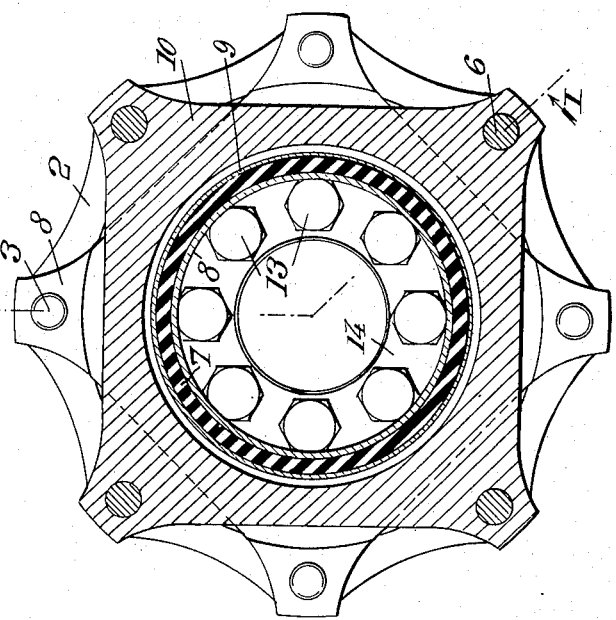
FIG. 2 is a cross section on the line II—II of FIG. 1.
Figure 1:
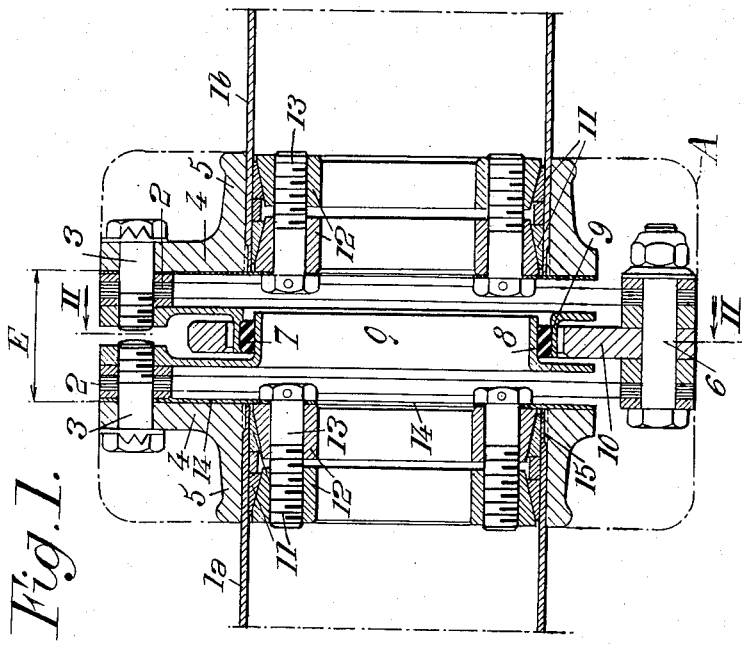
FIG. 1 is a longitudinal sectional view on the line I—I of FIG. 2 of a coupling device made according to a first embodiment of the invention.

This coupling device comprises, in the embodiment of FIGS. 1 and 2, coupling means having no resiliency in the circumferential direction but slightly deformable in radial planes about center O located on the common axis of shafts $1a$ and $1b$ when they are in line with each other.

Said coupling means comprise two annular structures 2, each consisting of a plurality of juxtaposed laminar steel rings, assembled together by bolts 6 so that no circumferential relative displacement is permitted between said rings but small angular displacements are possible in radial planes.

Each of said structures 2 is connected with one of the shafts $1a$ and $1b$ through a sleeve 5 fitted on said shaft and provided with radial arms 4 secured to said structure 2 through bolts 3.

In order to materialize pivot center O, an annular member 7 made of a resilient material is tightly held between two ring elements 8 and 9 provided with radial projections screwed on the bolts 3 of the two structures 2, respectively. A ring 10, held by bolts 6 surrounds ring 9 with a radial play so as to limit the transverse displacements thereof.

In order to provide an angular setting of each sleeve 5 with respect to the tubular shaft on which it is fitted the following arrangement is provided. Of course what will be said concerning the sleeve 5 mounted on shaft $1a$ applies in the same manner to the mounting of the other sleeve 5 on shaft $1b$.

According to the present invention there is mounted inside the end of tubular shaft $1a$, an expanding device consisting of annular members 11 adapted to be radially expanded by the action thereon of rings 12 having conical outer walls and adapted to be forced toward each other by means of bolt 13. The expanding device thus constituted is angularly connected to the corresponding sleeve 5 by a thin disc 14 secured to the expanding device through the bolts 13 thereof and to sleeve 5 through the bolts 3 serving to secure the corresponding annular structures 2.

With such an arrangement, owing to the provision of discs 14, shafts 1a and 1b are coupled together not only by the action of the external friction torque due to the contact between shafts 1a and 1b on the one hand and sleeves 5 on the other hand, but also by the internal friction torque due to the contact of expanding devices 11 with the inner walls of shafts 1a and 1b.

In order to avoid any angular slipping between a shaft 1a or 1b, and the corresponding sleeve 5 (such a slipping being to be feared if the torque that is transmitted is greater than the sum of the two friction torques above cited) a positive coupling is ensured between each of the sleeves 5 and the tubular shaft 1a or 1b, corresponding thereto, such a positive coupling being obtained by means of ribs 15.

There is provided between the respective ends of shafts 1a and 1b that face each other, a substantial interval E, the coupling means and the centering means being dimensioned to be housed in said space E.

Owing to this construction it is possible:

Either to take to pieces the peripheral connecting means and the centering device without having to displace the shafts, this taking to pieces being obtained by mere removal of bolts 3 and 6, which permits a transverse disengagement of annular structure 2 and of the centering device; or To remove only one of the shafts, 1a or 1b, after removal of the peripheral connecting means and of the centering devices connected to the ends of said shaft, if it is supposed that it is an intermediate shaft.

Two other features of the invention, independent of the preceding ones, will now be examined. By way of example it will be supposed that said features are applied to the case of a device for coupling two tubular shafts 1a and 1b each provided at its end with a sleeve 5, an expanding device 11, 12 and 13 and a disc 14 for transmitting the internal and external friction torques.

Figure 3:
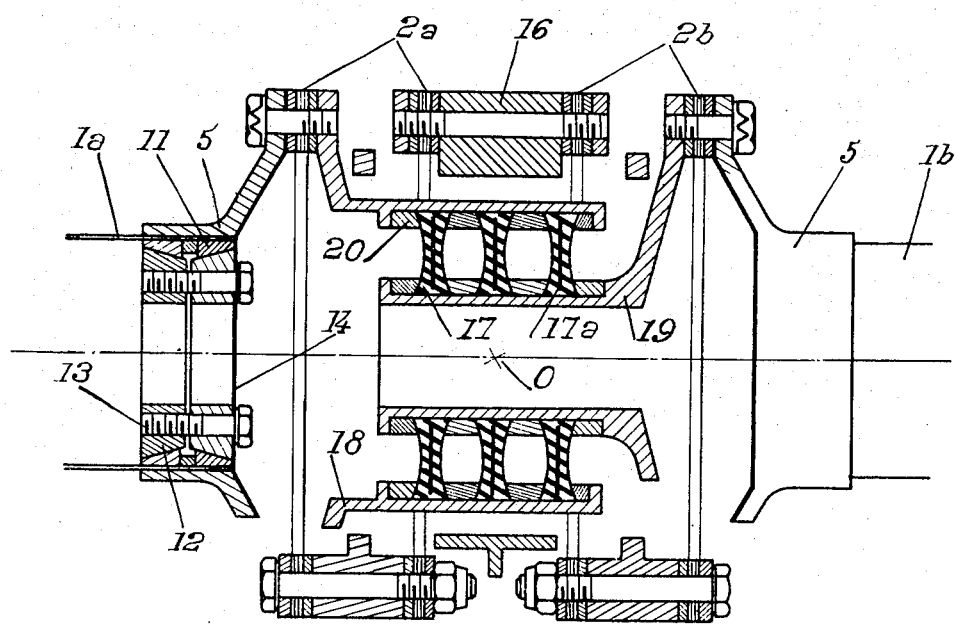
FIG. 3 is a longitudinal sectional view of a coupling device made according to a second embodiment of the invention.

FIG. 3 illustrates the first of these two features.

In order to couple the sleeves 5 of respective shafts 1a and 1b together, use is made of two pairs of annular structures 2a and 2b. One of these pairs, 2a, connects shaft 1a to an intermediate rigid element 16 disposed coaxially with shafts 1a and 1b and the other pair 2b serves to connect said intermediate element 16 with shaft 1b. Furthermore, between shafts 1a and 1b there is interposed a plurality of bracing resilient discs 17 (for instance three such discs in the case of FIG. 3) capable, by deformation in their respective planes, of maintaining the intersection point O of the axes of said shafts substantially at the middle of the coupling device.

These discs 17, made for instance of rubber, are interposed between the cylindrical walls of two coaxial sleeves 18 and 19 rigid with shafts 1a and 1b respectively. Said discs 17 are advantageously, as shown, fixed axially by distance rings 20.

Advantageously, discs 17 are reinforced by flexible metal discs 17a which are for instance provided with radial slots in order to increase their flexibility.

Discs 17 might be constituted solely by such flexible metal disc without making use of a resilient material such as rubber.

Figure 4:
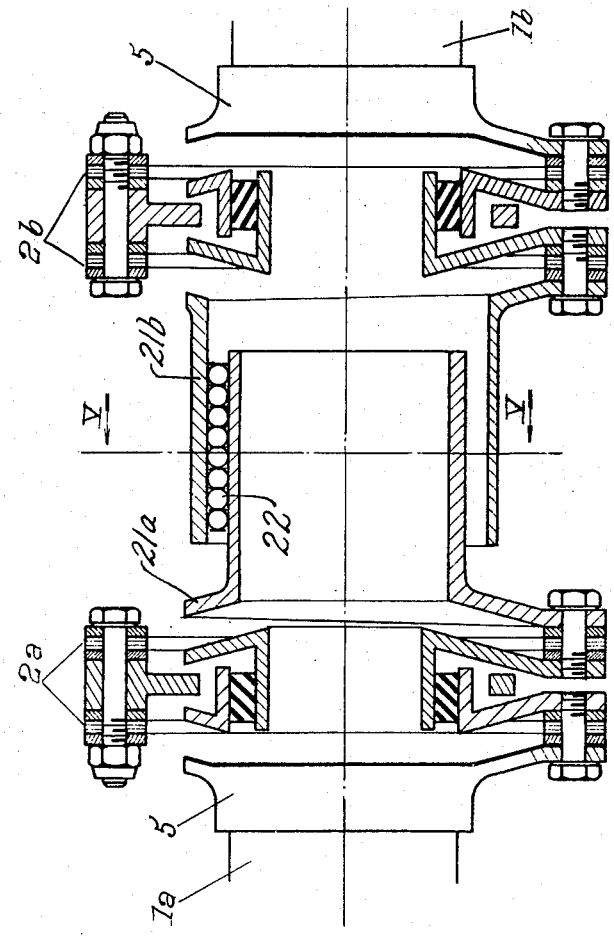
FIG. 4 is a view similar to FIG. 3 but showing a third embodiment.
Figure 5:
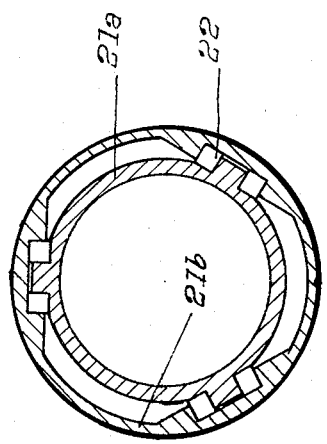
FIG. 5 is a cross section on the line V—V of FIG. 4.

FIGS. 4 and 5 illustrate the second of the two above mentioned features.

In this embodiment of the invention, the means for connecting sleeve members 5 with the shaft member 1a and 1b respectively are the same as in the above described embodiments in FIGS. 1–2 and FIG. 3, respectively.

In this case in order to connect together the sleeves 5 of shafts 1a and 1b, use is made of two pairs of flexible annular structures 2a and 2b respectively connected to two cooperating telescopic elements 21a and 21b forming together a sliding joint and interconnected through cooperating ribs. As shown by FIG. 5, there is interposed, between the cooperating male and female elements of these sliding joints, rolling means constituted in the examples shown by rows of rollers 22 interposed between the sides of every rib and the corresponding sides of the grooves cooperating with said rib, said rollers having their axes disposed perpendicularly to the axes of the shafts.

It should be noted that, for ever rib the rollers 22 may form a continuous chain along said rib. This combination of flexible annular members with a sliding joint including rolling elements permits of absorbing:

(a) The relative movements of shafts 1a and 1b having a small axial component by the mere effect of annular structures 2a and 2b, thus avoiding the phenomenon of friction corrosion in the sliding joint, such relative movements generally producing high frequency vibrations in the machines coupled by means of the device;

(b) Displacements of said shafts having a more important axial component by the deformation of said sliding joint which works under favorable conditions owing to the presence of rolling means interposed between the cooperating portions of the male and female elements of the joint, such displacements have a more important axial component resulting for instance from thermal expansion or from relative functional displacements of the elements coupled together.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. In a system including two rotating parts, a driving one and a driven one, mounted to rotate substantially in line with each other, said driving part being tubular, a device for coupling said parts together which comprises, in combination, a sleeve coaxially fitted on the outer wall of said tubular driving part, positive coupling means between said sleeve and said tubular driving part, an expanding device in frictional contact with the inner wall of said tubular driving part so as to be frictionally coupled with said tubular driving part, at least one connecting piece interposed between said expanding device and said sleeve for preventing angular displacement between them, and means for angularly connecting said sleeve with said driven part for coupling them together.

2. A coupling device according to claim 1 comprising cooperating grooves and ribs provided on said sleeve with said tubular driving part for positively coupling them together.

3. A coupling device according to claim 1 wherein said connecting piece consists of a thin disc applied both on the edge of said sleeve and on said expanding device.

4. In a system including two tubular shafts mounted substantially in line with each other, a device for coupling said shafts together which comprises, in combination, a sleeve force fitted in positive coupling fashion on each of said shafts, respectively, an expanding device in frictional contact with the inner wall of each of said tubular shafts and capable of exerting on said inner wall an outward radial pressure tending to apply the outer wall of said tubular shaft against the inner wall of that of said sleeves which is fitted thereon, at least one connecting piece interposed between each of said expanding devices and the corresponding sleeve for preventing angular displacement between them, torque transmitting means between said two sleeves, and means for causing the small relative pivoting displacements of said shafts to take place about a center located on said axis, said last mentioned means comprising two auxiliary parts operatively connected to said two shafts so as to be coaxial therewith, respectively, said two parts surrounding each other about said center, and a resilient annular member interposed between said annular parts for interconnecting them.

5. In a system including two shafts mounted substantially in line with each other and liable to undergo small axial displacements and misalinements with respect to each other, a device for coupling said shafts together which comprises, in combination, a rigid intermediate annular element located between said two shafts and in line therewith, connecting means between each end of said intermediate annular member and the shaft opposite which said annular member end is located, each of said connecting means comprising a pair of normally coaxial annular structures mutually secured to each other and respectively secured to one of said shafts and to said intermediate annular element, said annular structures having practically no resiliency in the circumferential direction but being slightly deformable in radial planes passing through the axis common to said two shafts when they are in line with each other, and means for causing the small relative pivoting displacements of said shafts to take place about a center located on said axis, said last mentioned means comprising two sleeves each connected to one of said shafts and substantially in line therewith, said two sleeves surrounding each other, and annular discs interposed between said sleeves transversely thereto, for urging the point of intersection of said two shafts toward a middle position between said shafts.

6. In a system including two tubular shafts mounted substantially in line with each other and liable to undergo small axial displacements and misalinements with respect to each other, a device for coupling said shafts together which comprises, in combination, a rigid intermediate annular element located between said two shafts and in line therewith, connecting means between each end of said intermediate annular member and the shaft opposite which said annular member end is located, each of said connecting means comprising a sleeve force fitted in positive coupling fashion on said last mentioned shaft, an expanding device in frictional contact with the inner wall of said last mentioned shafts and capable of exerting on said inner wall an outward radial pressure tending to apply the outer wall of said last mentioned tubular shaft against the inner wall of said sleeve, a pair of normally coaxial annular structures mutually secured to each other and respectively secured to said sleeve and to said intermediate annular element, said annular structures having practically no resiliency in the circumferential direction but being slightly deformable in radial planes passing through the axis common to said two shafts when they are in line with each other, and means for causing the small relative pivoting displacements of said shafts to take place about a center located on said axis, said last mentioned means comprising two sleeves each connected to one of said shafts and substantially in line therewith, said two sleeves surrounding each other, and annular discs interposed between said sleeves transversely thereto, for urging the point of intersection of said two shafts toward a middle position between said shafts.

7. A coupling device according to claim 6 further characterized in that said discs are made of rubber.

8. A coupling device according to claim 6 further characterized in that said discs are made of a rubber body with an annular metal reinforcement therein.

9. In a system including two shafts mounted substantially in line with each other and liable to undergo small axial displacements and misalinements with respect to each other, a device for coupling said shafts together which comprises, in combination, two rigid intermediate tubular elements located between said two shafts and in line therewith, said elements being telescopically engaged in each other, connecting means between each of said intermediate elements and one of said shafts respectively, each of said connecting means comprising a pair of normally coaxial annular structures mutually secured to each other and respectively secured to said last mentioned shaft and to said corresponding tubular element, said annular structures having practically no resiliency in the circumferential direction but being slightly deformable radially with respect to the axis common to said two shafts when they in line with each other, said two intermediate tubular elements being provided with cooperating longitudinal ribs, respectively, and rolling means disposed in longitudinal files each between a rib belonging to one tubular element and a rib belonging to the other element, the axes of said rolling means being perpendicular to the general direction of said shafts.

10. A coupling device according to claim 9 wherein said rolling means consist of rolling members disposed to form continuous chains.

11. In a system including two shafts mounted substantially in line with each other and liable to undergo small axial displacements and misalinements with respect to each other, a device for coupling said shafts together which comprises, in combination, two rigid intermediate tubular elements located between said two shafts and in line therewith, said elements being telescopically engaged in each other, connecting means between each of said intermediate elements and one of said shafts respectively, each of said connecting means comprising a sleeve force fitted in positive coupling fashion on said last mentioned shaft, a pair of normally coaxial annular structures mutually secured to each other and respectively secured to said sleeve and to said corresponding tubular element, said annular structures having practically no resiliency in the circumferential direction but being slightly deformable radially with respect to the axis common to said two shafts when they are in line with each other, an expanding device in frictional contact with the inner wall of said last mentioned shaft and capable of exerting on said inner wall an outward radial pressure tending to apply the outer wall of said last mentioned shaft against the inner wall of said sleeve, and a connecting piece interposed between said expanding device and said sleeve for preventing angular displacement between them, said two intermediate tubular elements being provided with cooperating longitudinal ribs, respectively, and rolling means disposed in longitudinal files each between a rib belonging to one tubular element and a rib belonging to the other element, the axes of said rolling means being perpendicular to the general direction of said shafts.

References Cited by the Examiner

UNITED STATES PATENTS

| | | | |
|---|---|---|---|
| 1,475,462 | 11/1923 | Furnquist | 64—13 |
| 1,650,202 | 11/1927 | Evans et al. | 64—13 |
| 2,182,711 | 12/1939 | Thomas | 64—13 |
| 2,790,312 | 4/1957 | Hagenlocher et al. | 64—13 |
| 2,937,514 | 5/1960 | Van Ranst | 64—30 |
| 2,797,147 | 4/1961 | Naumann | 64—23 |
| 3,020,737 | 2/1962 | Firth | 64—11 |
| 3,108,457 | 10/1963 | Weasler | 64—13 |
| 3,165,065 | 1/1965 | Stickel | 64—11 |

BROUGHTON G. DURHAM, *Primary Examiner.*

HALL C. COE, *Examiner.*